United States Patent [19]
Lu et al.

[11] Patent Number: 5,866,872
[45] Date of Patent: Feb. 2, 1999

[54] PLASMA ARC TORCH POSITION CONTROL

[75] Inventors: Zhipeng Lu, Hanover; John Sobr, Lebanon; Norm LeBlanc, Claremont; Jeffrey L. Peterson, Lebanon, all of N.H.

[73] Assignee: Hypertherm, Inc., Hanover, N.H.

[21] Appl. No.: 900,309

[22] Filed: Jul. 25, 1997

[51] Int. Cl.$^6$ .................................................. B23K 10/00
[52] U.S. Cl. ........................... 219/121.56; 219/121.57; 219/121.54; 219/130.31
[58] Field of Search .................. 219/121.36, 121.59, 219/121.39, 121.44, 121.56, 121.54, 124.02, 130.01, 130.31

[56] References Cited

U.S. PATENT DOCUMENTS

5,521,350   5/1996   Nishi et al. ........................ 219/121.56

*Primary Examiner*—Mark H. Paschall
*Attorney, Agent, or Firm*—Testa, Hurwitz & Thibeault, LLP

[57] ABSTRACT

A plasma arc torch system includes a plasma arc torch and a positioning apparatus for automated processing of workpieces. In order to maintain consistent cut quality, a controller maintains arc voltage at a predetermined reference value by controlling a standoff between the torch and the workpiece. To prevent contact between the torch and workpiece during kerf crossings and to maintain an optimum standoff during acceleration and deceleration, standoff control override algorithms are implemented in the controller. Additionally, a contact sensing apparatus is provided to automatically retract the torch in the event of contact with the workpiece during processing.

27 Claims, 6 Drawing Sheets

PLASMA ARC TORCH POSITION CONTROL

TECHNICAL FIELD

The present invention relates to plasma arc torch systems and, more specifically, to a plasma arc torch position control employing feedback methods and apparatus to automatically control a standoff between a tip of the torch and a workpiece being processed.

BACKGROUND

Plasma arc torches are widely used for cutting metallic materials and can be employed in automated systems for automatically processing a workpiece. The system may include the plasma arc torch, an associated power supply, a positioning apparatus, and an associated controller. At least one of the plasma arc torch and the workpiece may be mounted on the positioning apparatus which provides relative motion between the tip of the torch and the workpiece to direct the plasma arc along a processing path.

The plasma arc torch generally includes a torch body, an electrode mounted within the body, passages for cooling and arc control fluids, a swirl ring to control the fluid flow patterns, a nozzle with a central exit orifice, electrical connections, and a power supply. The torch produces the plasma arc, which is a constricted ionized jet of a plasma gas with high temperature and high momentum. A shield may also be employed on the tip of the torch to protect the nozzle and to provide a shield gas flow to the area proximate the plasma arc. Gases used in the torch can be non-reactive (e.g. argon or nitrogen), or reactive (e.g. oxygen or air).

In operation, the tip of the torch is positioned proximate the workpiece by the positioning apparatus. A pilot arc is first generated between the electrode (cathode) and the nozzle (anode) by using, for example, a high frequency, high voltage signal. The pilot arc ionizes gas passing through the nozzle exit orifice. As the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, to cut the workpiece.

The controller directs the torch tip along a nominal processing path. Due to variability in workpiece geometry and relative spatial location of the workpiece and the torch tip, the standoff or distance between the torch tip and workpiece may vary along the processing path. When employing a constant output current generator, changes in standoff and resultant plasma arc length effect arc voltage, arc power, and cut quality. In extreme cases, the torch tip can crash into the workpiece or be so far from the workpiece that the plasma arc is extinguished.

Some systems employ feedback control, controlling the arc voltage during processing by adjusting the standoff to maintain a predetermined arc voltage value. Such control schemes, however, are problematic in a variety of common scenarios. For example, when the torch tip traverses a discontinuity in the workpiece such as a kerf, the arc voltage increases rapidly. To compensate for the increase, the controller directs the positioning system to decrease standoff rapidly, which can result in the torch tip crashing into the workpiece. A similar result may occur in situations where cutting speed is reduced, for example, when decelerating the torch to cut a corner or a complex contour in the workpiece. Such shortcomings limit the usefulness of these feedback control schemes.

Other types of feedback control are known to initially position the torch tip relative to the workpiece. For example, some systems drive the torch tip into the workpiece until the structure on which the torch is mounted deflects. Corrective action is then taken, such as reversing direction of travel to retract the torch a predetermined distance. Other systems may drive the torch tip into the workpiece until detection of an increase in drive motor power, then reverse motor direction for a predetermined period. These systems, however, tend to stress the mechanical components of the positioning apparatus and torch and can damage delicate components thereof due to repeated impact.

SUMMARY OF THE INVENTION

According to the present invention, a plasma arc torch system includes a plasma arc torch and an associated power supply for generating a plasma arc between an electrode of the torch and a workpiece to be processed. A positioning apparatus and controller are provided for relatively moving the torch and the workpiece along a processing path. The controller includes a module for measuring an operating parameter of the system and minimizing a deviation between the measured operating parameter and a predetermined reference value by controlling a standoff between the torch and the workpiece. The controller also includes at least one additional or second module for overriding the standoff control of the first module under certain operational conditions.

The second module may calculate a variable based upon the measured parameter and override the first module in the event an absolute value of the calculated variable exceeds a predetermined threshold value. The override may disable control of the standoff, thereby maintaining a constant value of a processing path spatial dimension, until such time as the absolute value of the calculated variable falls below the threshold value. Control of the standoff by the first module is thereafter enabled.

In an exemplary embodiment, the operating parameter may be a plasma arc voltage and the calculated variable may be a first derivative thereof, or the rate of change of the arc voltage with respect to time.

A circuit for providing the functionality of the first and second module may include a pair of elements or leads for respective connection to the torch electrode and the workpiece to provide an actual analog arc voltage signal. An analog to digital ("A/D") converter converts the analog signal to a digital signal for input to a processor such as a microprocessor. The processor calculates the deviation of the measured arc voltage relative to the reference arc voltage value, controlling standoff to minimize the deviation. The processor also calculates the absolute value of the first derivative of the measured arc voltage and compares the calculated value to the threshold value, disabling control of the standoff or enabling control of the standoff as the case may be.

Alternatively or additionally, the second module may be employed to sense contact between the torch and the workpiece, overriding the first module whenever contact is sensed. When contact is sensed, the second module may cause the positioning apparatus to retract the torch from the workpiece. When the second module thereafter senses an absence of contact between the torch and the workpiece, control of the standoff by the first module is enabled.

A circuit for providing the functionality of the second module according to this embodiment may include a pair of elements or leads for respective connection to the workpiece and a tip of the torch electrically isolated from the electrode. The torch tip connection may be to a nozzle or a shield of the torch. A power supply energizes the circuit and may include a power limiter for limiting at least one of a voltage and a current of a contact signal passing through the circuit. A frequency limiter may also be provided. A contact indicator indicates contact between the tip of the torch and the workpiece. The indicator may be a light emitting diode ("LED") for providing visual indication of contact, or may be the contact signal itself. An isolator may also be provided in the circuit to isolate electrically the contact signal from other circuitry in the controller or plasma arc power supply, as necessary. In an exemplary embodiment, the isolator may be an optical isolator.

The positioning apparatus may be any of a variety of multi-axis configurations, suitable for directing the torch along desired processing paths. For example, the positioning apparatus may include a generally planar table for fixturing of the workpiece, an overlaying gantry with the torch mounted thereon having three motorized, mutually orthogonal linear axes, and a suitable controller with three axis drives. Alternatively, the workpiece may be mounted on a single or compound axis rotary table. In another embodiment, the torch may be mounted on a multi-axis robotic arm. The workpiece may be mounted in a fixed position, on a rotary table, on a conveyor, or otherwise suitably fixtured and positioned.

According to the method of the invention, the torch is positioned proximate a workpiece and moved relative thereto along a processing path. An operating parameter of the system is maintained substantially constant during workpiece processing by measuring the operating parameter, comparing the measured value to a reference value to generate a deviation, and controlling a standoff between the torch and the workpiece to minimize the deviation. In certain circumstances, control of the standoff is overridden.

In a first circumstance, control of the standoff is disabled when an absolute value of a calculated variable based on the measured parameter exceeds a threshold value. Control of the standoff is thereafter enabled when the absolute value of the calculated variable falls below the threshold value. In an exemplary embodiment, the measured parameter is an arc voltage and the calculated variable is the first derivative thereof, or the rate of change of arc voltage with respect to time.

In another circumstance, control of the standoff is disabled upon sensing contact between the torch and the workpiece. In this instance, the torch is retracted from the workpiece until an absence of contact between the torch and the workpiece is sensed. Thereafter, control of standoff is enabled.

Several advantages may be realized by employing the apparatus and method according to the invention. For example, cut quality is more consistent and of higher quality than that produced by conventional systems since torch standoff is maintained substantially constant during speed changes, such as acceleration and deceleration, and when crossing discontinuities in the workpiece such as kerfs. Alternatively or additionally, contact between the torch and the workpiece is minimized in that the torch is immediately retracted upon detection of electrical continuity between the tip of the torch and the workpiece. Accordingly, mechanical stresses in the torch and positioning apparatus due to contact between the torch and the workpiece are also minimized.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION

Figure 1A:
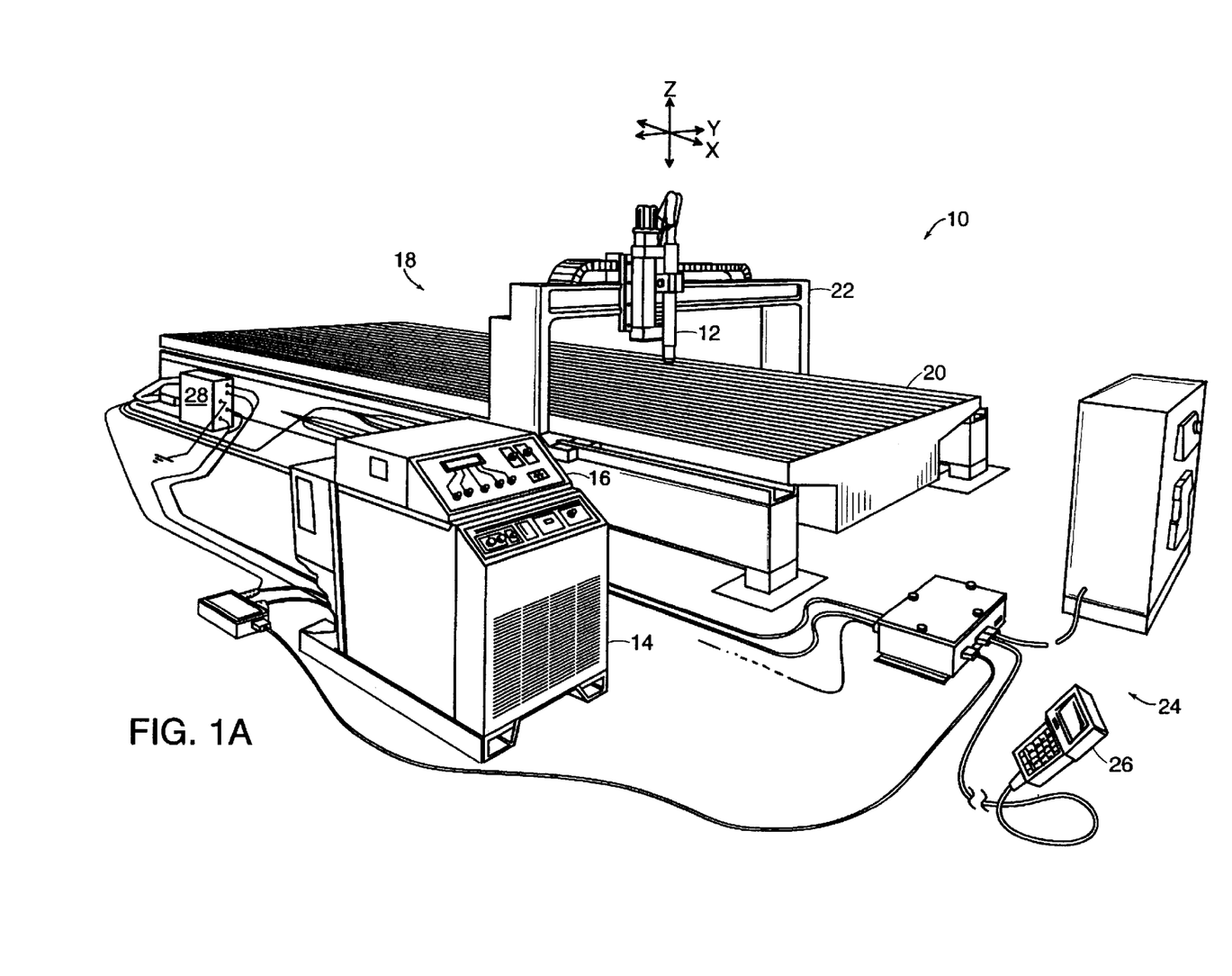
FIG. 1A is a schematic perspective view of a plasma arc torch system in accordance with an exemplary embodiment of the present invention.

FIG. 1A is a schematic perspective view of a plasma arc torch system 10 in accordance with an exemplary embodiment of the present invention. The system 10 includes a plasma arc torch 12 with an associated power supply 14 and a gas console 16 for generating a plasma arc. A positioning apparatus 18 includes a generally planar table 20 for fixturing of a workpiece (not depicted), an overlaying gantry 22 having three motorized, mutually orthogonal linear axes X, Y, and Z with the torch 12 mounted on the Z axis, and a suitable controller 24 with three axis drives. The controller 24 includes a first module for controlling a standoff between the torch 12 and a workpiece, as well as a second module for overriding the first module as will be discussed in greater detail hereinbelow. The controller 24 may also include an optional operator's pendant 26 for manually jogging the axes of the positioning apparatus 18. The system 10 also includes an HFHV console 28 for generating a pilot arc in the torch 12. Housed in the console 28 is a manifold for fluidic distribution including, for example, gas for shielding and sustaining the plasma arc and water for cooling a working end of the torch 12.

Figure 1B:
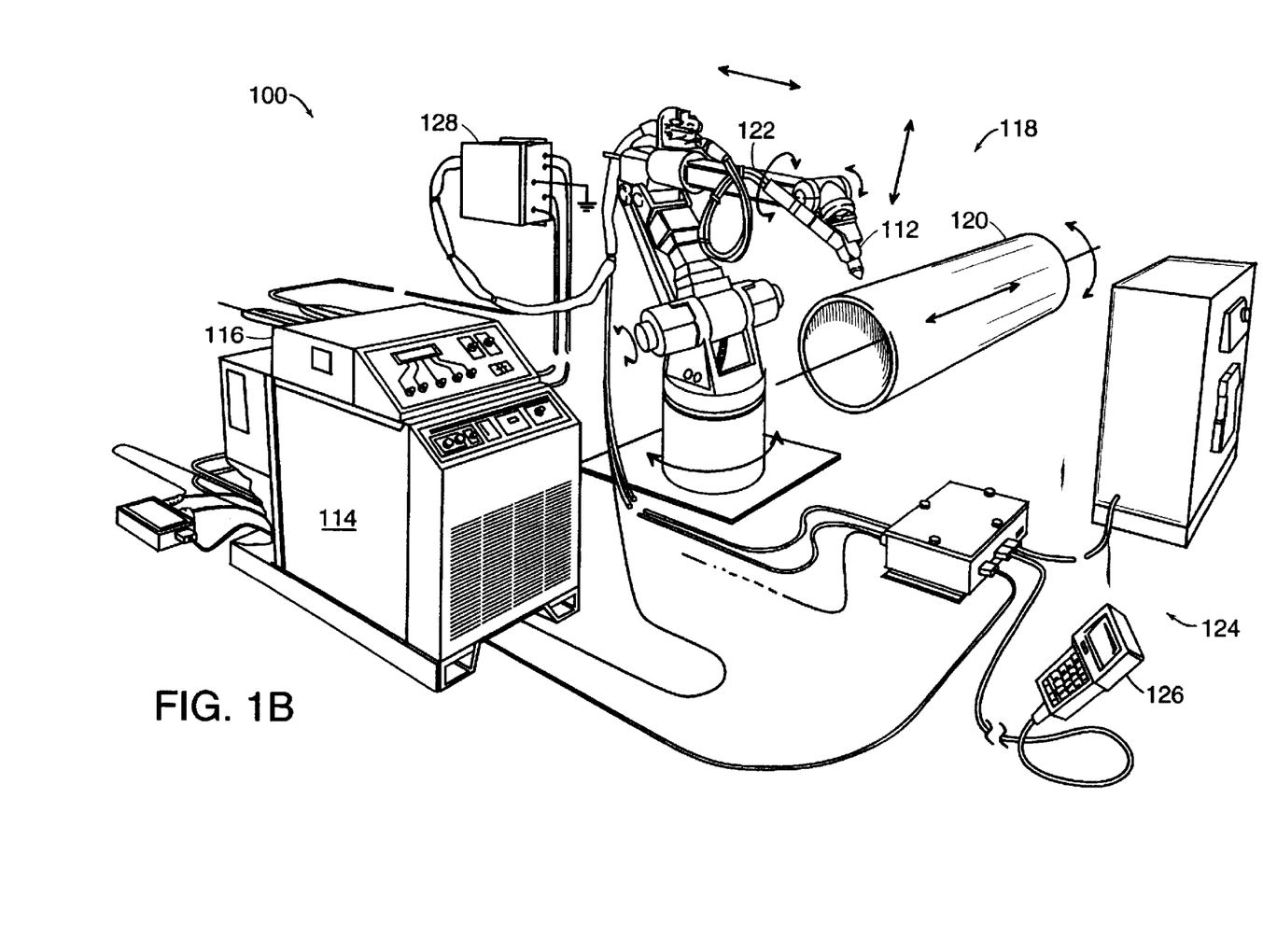
FIG. 1B is a schematic perspective view of a plasma arc torch system in accordance with an alternative embodiment of the present invention.

The control functionality of the present invention may be adapted for use in a variety of plasma arc torch systems. FIG. 1B is a schematic perspective view of a plasma arc torch system 100 in accordance with an alternative embodiment of the present invention. The system 100 includes a plasma arc torch 112 with an associated power supply 114 and a gas console 116 for generating a plasma arc. A positioning apparatus 118 includes a multi-axis, motorized robotic arm 122 on which the torch 112 is mounted. A workpiece 120 may be mounted in a fixed position, on a rotary table, on a conveyor, or otherwise suitably positioned within a work volume of the robotic arm 122. A controller 124 is provided with requisite axis drives. The controller 124 includes a first module for controlling a standoff between the torch 112 and the workpiece 120, as well as a second module for overriding the first module as will be discussed in greater detail hereinbelow. The controller 124 may also include an optional operator's pendant 126 for manually jogging the axes of the positioning apparatus 118. The system 100 also includes an HFHV console 128 for generating a pilot arc in the torch 112. Housed in the console 128 is a manifold for fluidic distribution including, for example, gas for shielding and sustaining the plasma arc and water for cooling a working end of the torch 112.

Figure 2A:
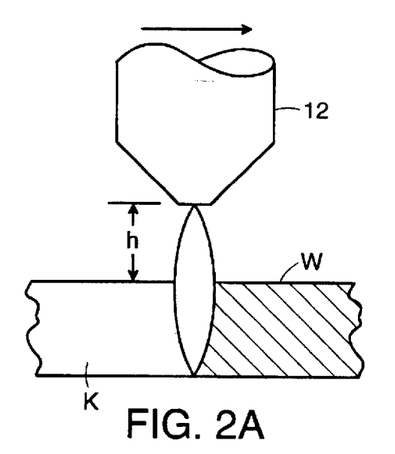
FIG. 2A is a schematic partially sectional view of a plasma arc torch working end cutting a workpiece at a constant standoff.
Figure 2B:
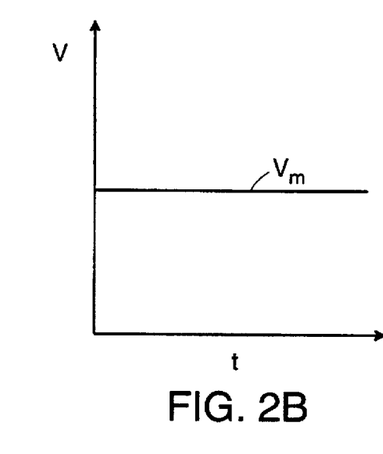
FIG. 2B is a schematic plot of measured arc voltage as a function of time for the cutting condition depicted in FIG. 2A.

During cutting of a workpiece, W, as a kerf, K, is created, as depicted schematically in FIG. 2A, an optimum standoff height, h, is sought to be maintained between a tip of the torch 12 and the workpiece, W. In the case where the torch 12 is traversing the workpiece, W, at a constant standoff and at a constant traverse speed, plasma arc voltage, V, is substantially constant as depicted in the schematic plot of measured arc voltage, $V_M$, as a function of time, t, in FIG. 2B.

Figure 3:
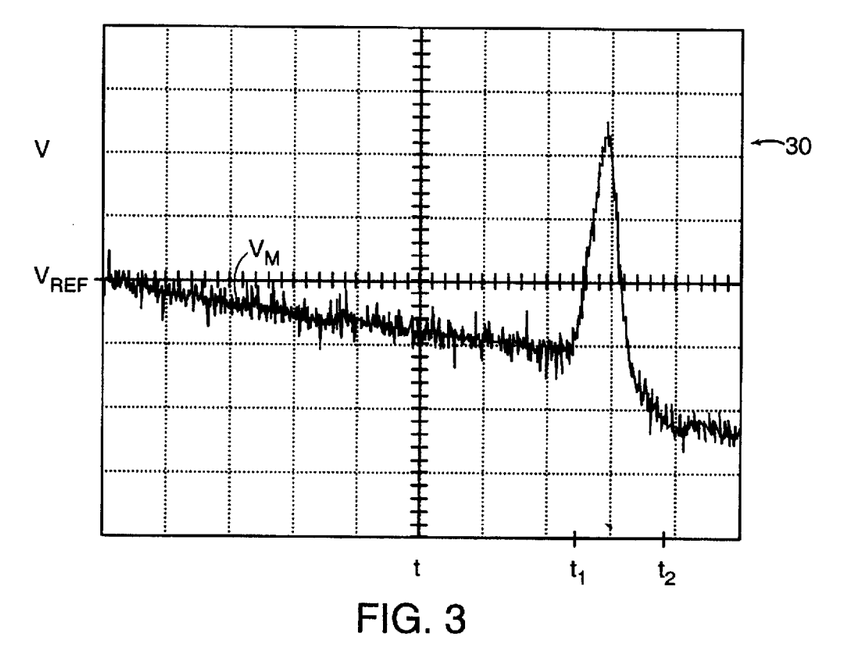
FIG. 3 is an empirical plot of measured arc voltage as a function of time for a cutting condition including workpiece warpage and a kerf crossing.

FIG. 3 is an empirical plot 30 of measured arc voltage, $V_M$, as a function of time, t, for a constant traverse speed cutting condition including workpiece warpage and a kerf crossing. There is no standoff control enabled. Unlike the constant arc voltage of the schematic plot of FIG. 2B, measured arc voltage, $V_M$, for the plot 30 has a generally negative slope. This gradual, negatively sloped curve is exemplary of localized workpiece warpage or tilt. As standoff height, h, decreases during the cut and the tip of the torch approaches the workpiece, measured arc voltage, $V_M$, decreases correspondingly. At time equal to about $t_1$, measured arc voltage, $V_M$, spikes sharply positive. This rapid increase is indicative of entering a kerf crossing condition. After reaching a maximum arc voltage value substantially corresponding to the center of the kerf, measured arc voltage rapidly decreases as the plasma arc exits the kerf crossing condition. At time equal to about $t_2$, normal cutting of the workpiece resumes.

To maintain consistent cut power and quality, the controller 24 according to the invention controls standoff during the periods prior to $t_1$ and after $t_2$ by adjusting standoff to drive measured arc voltage, $V_M$, to a predetermined reference arc voltage value, $V_{REF}$. During the period between $t_1$ and $t_2$, however, control of standoff is disabled to preclude the controller 24 from reacting to the kerf crossing voltage spike and driving the torch 12 into the workpiece.

Figure 4:
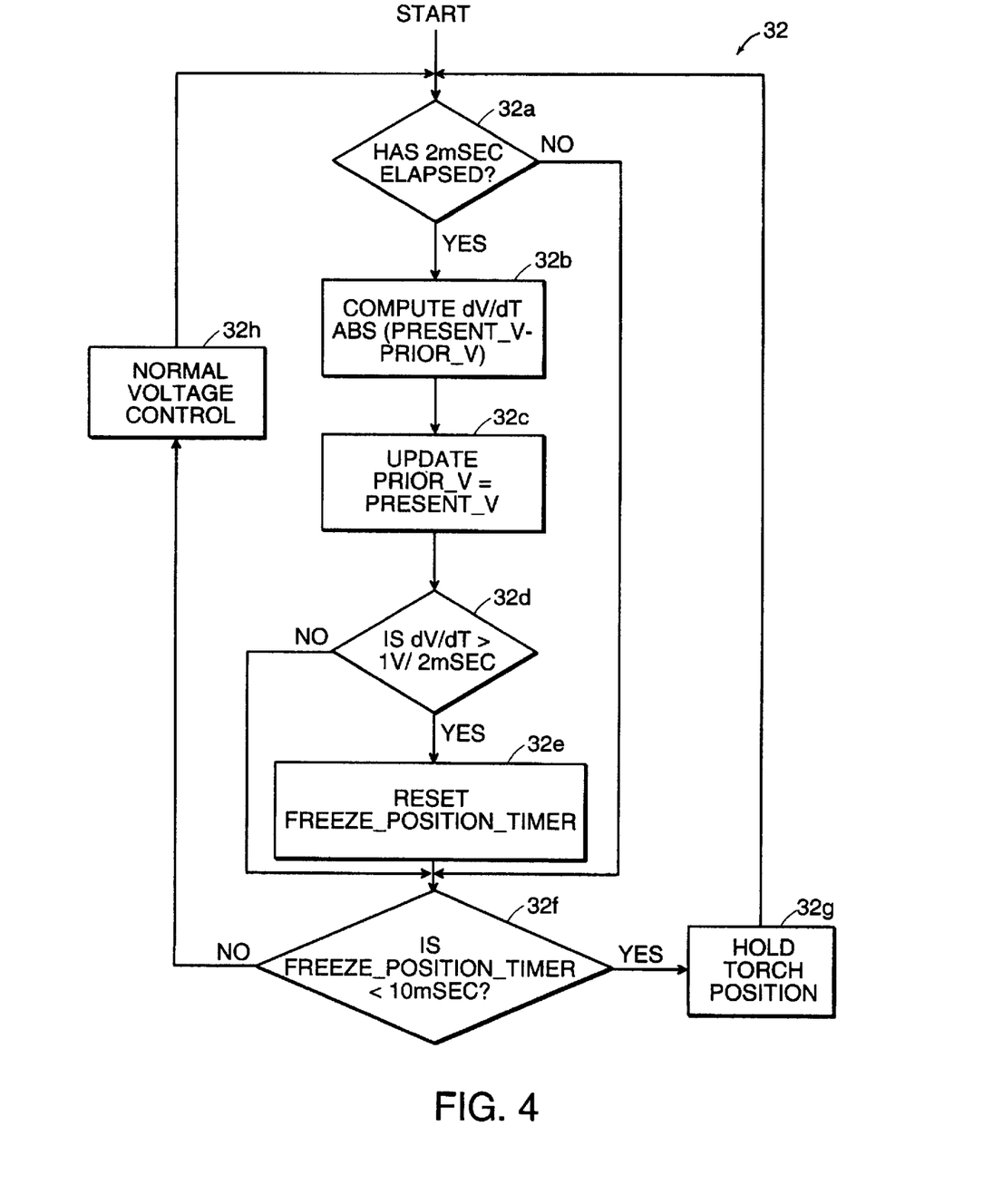
FIG. 4 is a flow chart for controlling standoff and overriding standoff control in accordance with an exemplary embodiment of the present invention.

A threshold slope value stored in the controller 24 determines when control of standoff is enabled and disabled in accordance with the algorithm depicted in the flow chart 32 of FIG. 4. The values presented in the flow chart 32 are exemplary in nature and not to be considered limiting. Any of a wide range of sampling times and threshold slope values may be employed, depending on a particular application. In the flowchart 32, a sampling rate of two milliseconds is used. Accordingly, whenever the torch 12 is operating in a transferred arc mode for processing of a workpiece, the measured arc voltage, $V_M$, is sampled every two milliseconds (step 32*a*) and the absolute value of the slope of the curve is calculated (steps 32*b*, 32*c*) and compared to a threshold value (step 32*d*). In the flow chart 32, this threshold value is set at one volt per two milliseconds or 500 volts/sec. If the absolute value of the slope of the curve is less than or equal to 500 volts/sec, control of arc voltage by adjustment of standoff remains enabled (step 32*h*). In the event, however, that the absolute value of the slope of the curve is greater than 500 volts/sec, as in the case of a kerf crossing spike, a freeze position timer is reset (step 32*e*) and the positioning system maintains the Z axis position or torch standoff height, h, for ten milliseconds (steps 32*f*, 32*g*). Thereafter, if the absolute value of the slope of the curve falls below the threshold value, control of standoff is enabled (step 32*h*) and the positioning apparatus 18 adjusts torch standoff height, h, to drive measured arc voltage, $V_M$, to the reference voltage, $V_{REF}$. In the event, however, that the absolute value of the slope of the curve continues to exceed the threshold value, the Z axis position is maintained (step 32*g*). For the robotic arm positioning apparatus 118 of the system 100, a corresponding axis position is maintained.

Testing has demonstrated that the absolute values of measured arc voltage slopes generated during a kerf crossing tend to be at least an order of magnitude greater than those generated due to workpiece warpage. For example, kerf crossing slopes can range from about 100 volts/sec to about 1000 volts/sec; whereas, warpage slopes are generally much less than 100 volts/sec. In FIG. 3, the kerf crossing spike slope is about 720 volts/sec. The warpage slope is about 14 volts/sec. Accordingly, kerf crossings and similar discontinuities can be reliably detected and accommodated readily with little chance of improperly overriding standoff control.

While FIG. 3 depicts the empirical plot 30 of a kerf crossing spike, relatively abrupt changes in measured arc voltage, $V_M$, occur during periods of traverse speed acceleration and deceleration, for example when cutting a right angle corner. By setting the threshold at an appropriate value, the tendency of the controller 24 to drive the torch 12 into the workpiece during deceleration and retract the torch 12 from the workpiece during acceleration can be overcome. The acceleration and deceleration response characteristics of the positioning apparatus 18 employed may be measured or modeled and stored in a table in the controller 24. This information, in conjunction with the type of material being cut, may be used to tailor algorithm variables such as slope threshold, sampling rate, and freeze position timer period to ensure proper system response. In an exemplary embodiment, the flow chart 32 of FIG. 4 may be implemented in a processor such as a microprocessor, with the analog arc voltage signal being first converted to a digital signal by an A/D converter.

Figure 5:
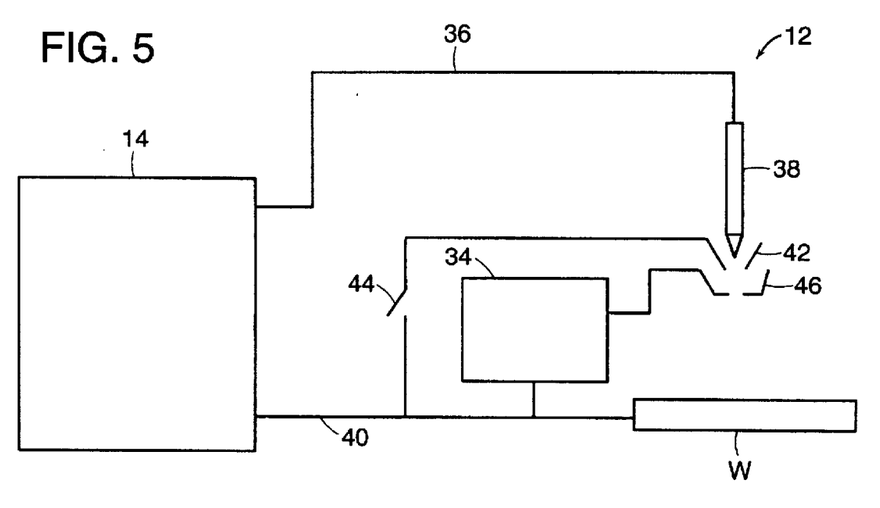
FIG. 5 is a schematic block diagram of a plasma arc torch including a contact sensing apparatus for overriding standoff control in accordance with an alternative embodiment of the present invention.

Since an optimum torch standoff height, h, may be on the order of about 0.02 inches (0.05 cm), the controller 24 may additionally or alternatively include a contact sense control module for sensing contact between a tip of the torch 12 and a workpiece, W, and responding appropriately. FIG. 5 is a schematic block diagram of a plasma arc torch 12 including a contact sensing apparatus 34 for overriding standoff control when contact is sensed. The torch 12 includes a power supply 14 having a first lead 36 connected to an electrode 38 and a second lead 40 connected to the workpiece. The second lead 40 is also connected to a nozzle 42 through a switch 44 to enable generation of a pilot arc between the electrode 38 and the nozzle 42. The contact sensing apparatus 34 is connected to the workpiece, W, for example via the second lead 40, and to a tip of the torch 12 electrically isolated from the electrode 38 such as the nozzle 42 or a shield 46, as depicted. The circuitry of the contact sensing apparatus 34 may be housed in the controller 24 and is discussed in greater detail hereinbelow with respect to FIG. 8.

Figure 6:
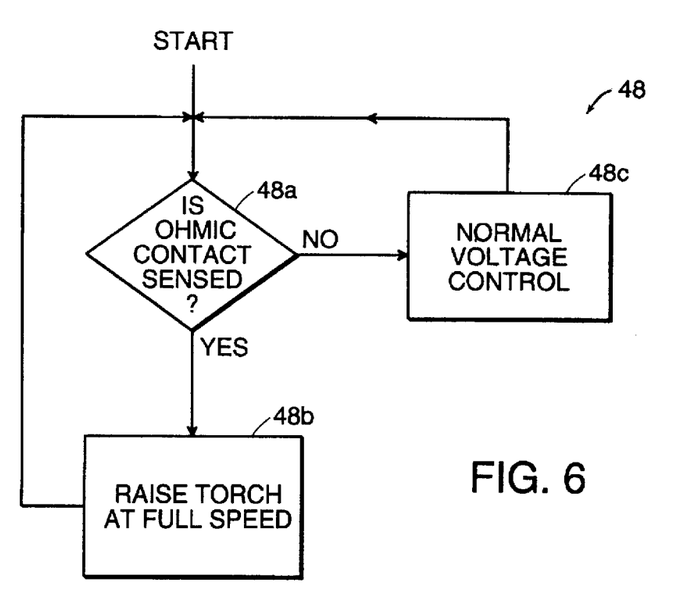
FIG. 6 is a flow chart for controlling standoff and overriding standoff control in accordance with the apparatus depicted in FIG. 5.

The contact sensing apparatus 34 operates in accordance with an algorithm depicted in the flow chart 48 of FIG. 6 and senses contact between the shield 46 and the workpiece, W, by means of a contact signal. Whenever the system 10 is operational, the shield 46 is held at a voltage potential relative to the workpiece, W. Upon contact between the shield 46 and the workpiece, W, resistance therebetween drops substantially to zero and current flows through the contact sensing apparatus 34. As soon as contact is sensed (step 48a), the controller 24 overrides standoff control and retracts the torch 12 from the workpiece, W, at a maximum rate (step 48b). When an absence of contact is sensed, standoff control is enabled (step 48c).

Figure 7:
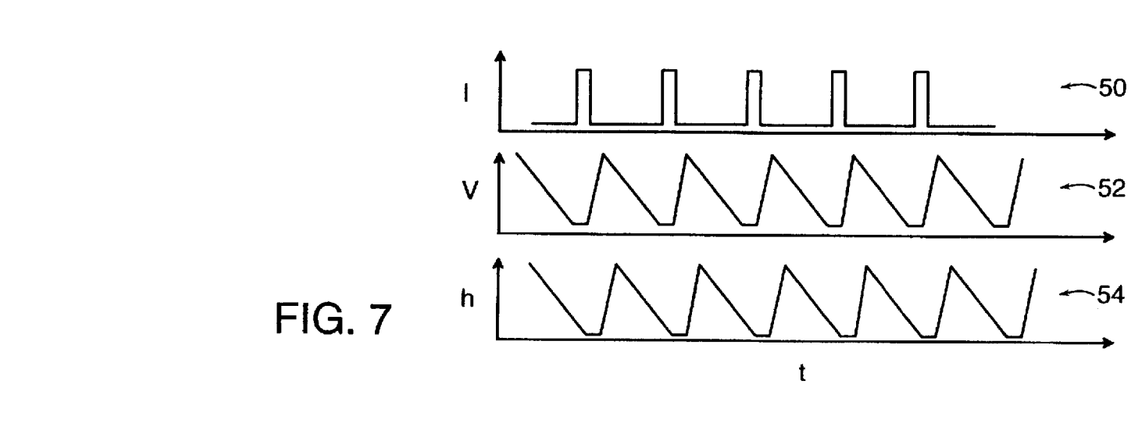
FIG. 7 is a schematic graphical representation of system parameters correlated as a function of time in accordance with the flow chart depicted in FIG. 6.

FIG. 7 is a schematic representation of selected system parameters correlated as a function of time in accordance with the algorithm depicted in the flow chart 48 of FIG. 6 for a system 10 in which the reference voltage, $V_{REF}$, is set too low or a consumable portion of the torch 12 such as the electrode 38 is worn excessively. The uppermost trace 50 represents contact sensing apparatus current, I, the center trace 52 represents plasma arc voltage, V, and the lower trace 54 represents torch standoff height, h. Under the aforementioned maladjusted operating conditions, the torch 12 is driven into the workpiece, W, in an attempt to minimize the deviation between the measured arc voltage, $V_M$, and the reference voltage, $V_{REF}$. When contact occurs between the shield 46 and the workpiece, W, current flows in the contact sensing apparatus 34 as indicated by the step function rise of the current trace 50. The controller 24 then overrides standoff control and causes the Z axis to decelerate to a stop and reverse direction, retracting the torch 12 at a maximum rate as depicted in the standoff height trace 54. As soon as an absence of contact is sensed, current stops flowing in the contact sensing apparatus 34 as indicated by the step function drop of the current trace 50. Thereafter, standoff control is enabled. In the case depicted, the contact and retract cycle continues to repeat due to the improper setting of the reference voltage, $V_{REF}$, or the worn electrode 38; however, in normal operation, contact and override of standoff control would occur infrequently.

Figure 8:
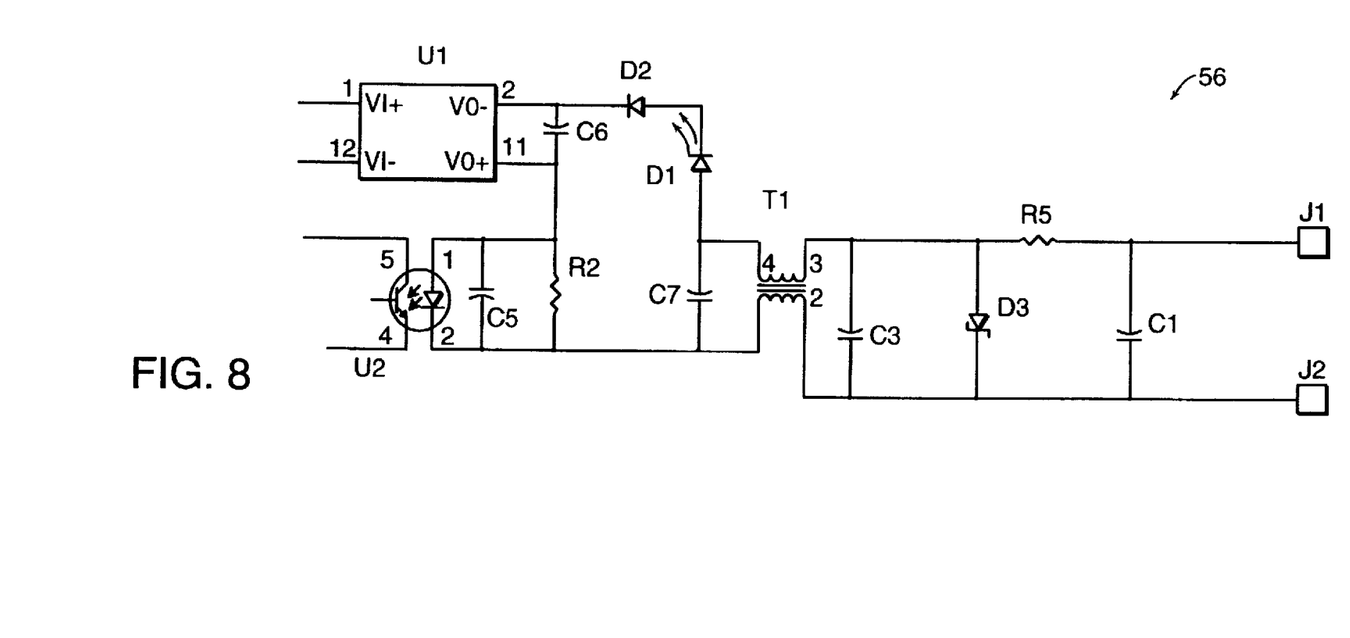
FIG. 8 is a schematic of a circuit for implementing contact sense override of standoff control in accordance with the alternative embodiment of the present invention.

An exemplary circuit 56 for implementing contact sense override of standoff control is shown schematically in FIG. 8. Also depicted therein is a portion of a circuit for measuring arc voltage, $V_M$. A first connector, J1, may be connected to the shield 46 or other electrically conductive structure located at the tip of the torch 12 and a second connector, J2, is connected to the workpiece, W. A power supply, such as a floating, isolated DC to DC converter, U1, provides a voltage potential across the connectors J1, J2, of 24 VDC, for example. When the connectors J1, J2 come into electrical contact due to contact between the shield 46 and the workpiece, W, current flows through the circuit 56. A contact indicator, such as an LED, D1, may be used to provide a visual indication of contact between the torch 12 and the workpiece, W. The contact signal is transmitted through an optical coupler, U2, to signal the controller 24 to override the standoff control and retract the torch 12.

Since the circuitry is energized during processing of the workpiece by the torch 12, the possibility exists that the high energy plasma arc could short to the shield 46. To prevent damage to the circuit 56 from a high current, high voltage short, power in the circuit is limited by the combination of a current limiting resistor, R5, and a zener diode, D3, which clamps voltage to a predetermined maximum value such as about 40 VDC. Frequency protection for the circuit 56 is afforded by the combination of several capacitors and a transformer, T1, which form a common mode choke to eliminate passage of high frequencies. The circuit 56 also includes an adjustable resistor, R1, which can be used to calibrate the circuit 56.

A third connector, J4, may be connected to the electrode 38 and the signal between the electrode 38 and the workpiece, W, passed through a second transformer, T2, to isolate and scale an analog arc voltage signal, $V_M$. As stated hereinabove, the analog signal thereafter passes through an A/D converter to generate a digital arc voltage signal for processing by the controller 24.

While there have been described herein what are to be considered exemplary and preferred embodiments of the present invention, other modifications of the invention will become apparent to those skilled in the art from the teachings herein. For example, the controller may be programmed to respond differently upon detection of a kerf crossing or contact between the torch and the workpiece. Additionally, the control algorithms could be used to detect the spatial location of an edge of the workpiece instead of or in addition to a kerf or other discontinuity. It is therefore desired to be secured in the appended claims all such modifications as fall within the spirit and scope of the invention. Accordingly, what is desired to be secured by Letters Patent is the invention as defined and differentiated in the following claims.

what is claimed is:

1. A plasma arc torch system comprising:
   a plasma arc torch for generating an arc between the torch and a workpiece;
   a positioning apparatus for relatively moving the torch and the workpiece; and
   a controller for maintaining a substantially constant operating parameter of the arc during processing of the workpiece, the controller comprising:
      a first module for measuring the operating parameter and for minimizing a deviation between the measured operating parameter and a reference value by controlling a standoff between the torch and the workpiece; and
      a second module for calculating a variable based upon the measured parameter and disabling the first module when an absolute value of the calculated variable exceeds a threshold value.

2. The invention according to claim 1 wherein the second module enables control of the standoff by the first module when the absolute value of the calculated variable falls below the threshold value.

3. The invention according to claim 1 wherein the operating parameter comprises an arc voltage.

4. The invention according to claim 2 wherein the calculated variable comprises a rate of change of the arc voltage.

5. The invention according to claim 1 wherein the positioning apparatus comprises at least two linear axes of motion.

6. The invention according to claim 1 wherein the positioning apparatus comprises at least one rotary axis of motion and one linear axis of motion.

7. A plasma arc torch system comprising:
   a plasma arc torch for generating an arc between the torch and a workpiece;
   a positioning apparatus for relatively moving the torch and the workpiece; and
   a controller for maintaining a substantially constant operating parameter of the arc during processing of the workpiece, the controller comprising:
      a first module for measuring the operating parameter and for minimizing a deviation between the measured operating parameter and a reference value by controlling a standoff between the torch and the workpiece; and a second module for sensing contact between the torch and the workpiece and overriding the first module when contact is sensed.

8. The invention according to claim 7 wherein the second module causes the positioning apparatus to retract the torch from the workpiece.

9. The invention according to claim 8 wherein the second module enables control of the standoff by the first module when the second module senses an absence of contact between the torch and the workpiece.

10. The invention according to claim 7 wherein the positioning apparatus comprises at least two linear axes of motion.

11. The invention according to claim 7 wherein the positioning apparatus comprises at least one rotary axis of motion and one linear axis of motion.

12. A method of processing a workpiece using a plasma arc torch comprising the steps of:

(a) positioning the torch proximate the workpiece;

(b) generating an arc between the torch and the workpiece;

(c) moving relatively the torch and the workpiece along a processing path;

(d) maintaining a substantially constant operating parameter of the arc during processing of the workpiece by:
  (i) measuring the operating parameter;
  (ii) comparing the operating parameter to a reference value to generate a deviation; and
  (iii) controlling a standoff between the torch and the workpiece to minimize the deviation; and (e) disabling control of the standoff when an absolute value of a calculated variable based on the measured parameter exceeds a threshold value.

13. The invention according to claim 12 further comprising the step of:

(f) enabling control of the standoff when the absolute value of the calculated variable falls below the threshold value.

14. The invention according to claim 12 wherein the operating parameter comprises an arc voltage.

15. The invention according to claim 14 wherein the calculated variable comprises a rate of change of the arc voltage.

16. A method of processing a workpiece using a plasma arc torch comprising the steps of:

(a) positioning the torch proximate the workpiece;

(b) generating an arc between the torch and the workpiece;

(c) moving relatively the torch and the workpiece along a processing path;

(d) maintaining a substantially constant operating parameter of the arc during processing of the workpiece by:
  (i) measuring the operating parameter;
  (ii) comparing the operating parameter to a reference value to generate a deviation; and
  (iii) controlling a standoff between the torch and the workpiece to minimize the deviation; and (e) overriding control of the standoff upon sensing contact between the torch and the workpiece.

17. The invention according to claim 16 wherein the overriding step further comprises retracting the torch from the workpiece.

18. The invention according to claim 17 further comprising the step of:

(f) enabling control of the standoff upon sensing absence of contact between the torch and the workpiece.

19. The invention according to claim 16 wherein the overriding step comprises disabling control of the standoff upon sensing contact between the torch and the workpiece.

20. A circuit for sensing contact between a plasma arc torch and a workpiece positioned relative thereto by a positioning apparatus, the circuit comprising:

a first element for connection to a tip of the torch, the first element being electrically isolated from a torch electrode;

a second element for connection to the workpiece;

a power supply for energizing the circuit;

a power limiter for limiting at least one of a voltage and a current of a contact signal passing though the circuit; and a contact indicator for indicating contact between the tip of the torch and the workpiece.

21. The invention according to claim 20 further comprising an isolator to isolate electrically the contact signal from other circuitry.

22. The invention according to claim 21 wherein the isolator comprises an optical coupler.

23. The invention according to claim 20 wherein the contact indicator comprises the contact signal.

24. The invention according to claim 20 wherein the contact indicator comprises a light emitting diode.

25. The invention according to claim 20 wherein the tip of the torch comprises at least one of a nozzle and a shield.

26. A circuit for controlling a standoff between a plasma arc torch and a workpiece positioned relative thereto by a positioning apparatus, the circuit comprising:

a first element for connection to an electrode of the torch;

a second element for connection to the workpiece;

a converter for converting an analog arc voltage signal to a digital arc voltage signal; and a processor including:
  (i) a first module for minimizing a deviation between the digital arc voltage signal and a reference value by controlling the standoff when an absolute value of a variable based on the digital arc voltage signal is less than a threshold value; and
  (ii) a second module for disabling control of the standoff when an absolute value of the variable exceeds the threshold value.

27. The invention according to claim 26 wherein the variable comprises a rate of change of the digital arc voltage signal.

* * * * *

UNITED STATES PATENT AND TRADEMARK OFFICE
CERTIFICATE OF CORRECTION

PATENT NO. : 5,866,872
DATED : February 2, 1999
INVENTOR(S) : Lu, et al

It is certified that error appears in the above-identified patent and that said Letters Patent is hereby corrected as shown below:

The Drawing Sheet , consisting of Figure 7 and 8, should be deleted to be replaced with the Drawing Sheet, consisting of Figs 7 and 8, as shown on the attached page.

Signed and Sealed this

Fourteenth Day of September, 1999

*Attest:*

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,866,872
DATED : Feb. 2, 1999
INVENTOR(S) : Lu, et al

Page 2 of 3

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,866,872  
DATED : February 2, 1999  
INVENTOR(S) : Lu et al

It is certified that error appears in the above-identified patent and that said Letters Patent is hereby corrected as shown below:

On the cover page: Item [56] Reference Cited, add the following:

| | | |
|---|---|---|
| --5,371,336 | 12/1994 | Albert et al. |
| 4,888,490 | 12/1989 | Bass et al. |
| 5,620,617 | 04/1997 | Borowy et al. |
| 4,203,022 | 05/1980 | Couch, Jr. et al. |
| 4,650,957 | 03/1987 | Cullen et al. |
| 4,101,754 | 07/1978 | Fischer |
| 4,795,882 | 01/1989 | Hardwick et al. |
| 5,290,995 | 03/1994 | Higgins et al. |
| 4,766,286 | 08/1988 | Iceland |
| 5,192,847 | 03/1993 | Jagiella et al. |
| 5,326,955 | 07/1994 | Nishi et al. |
| 5,288,970 | 02/1994 | Nishi |
| 5,187,348 | 02/1993 | Cuba et al. |
| 5,160,821 | 11/1992 | Oakley |
| 4,415,795 | 11/1983 | Ross et al. |
| 4,682,004 | 07/1987 | Schmall |
| 4,677,275 | 06/1987 | Schmall-- |

Item [56] Foreign Document: add the following:

| | | |
|---|---|---|
| --WO 94/05456 | 03/1994 | WIPO --. |